April 15, 1952     C. TIFFANY     2,592,834
HYDROCARBON GAS DETECTOR

Filed Nov. 26, 1947     3 Sheets-Sheet 1

INVENTOR.
CARTER TIFFANY.

BY

ATTORNEYS.

April 15, 1952     C. TIFFANY     2,592,834
HYDROCARBON GAS DETECTOR
Filed Nov. 26, 1947     3 Sheets-Sheet 2
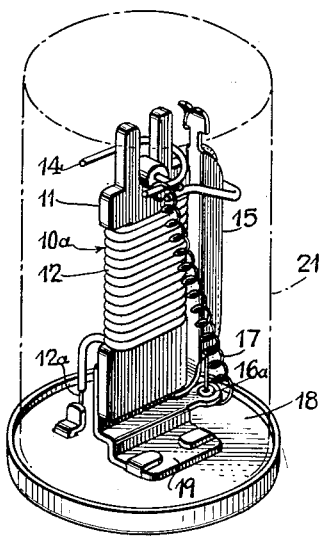
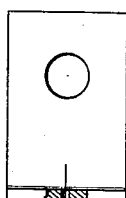
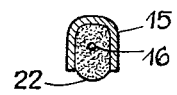
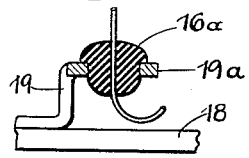
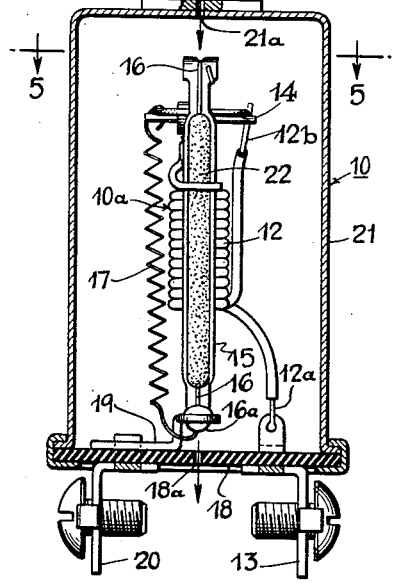
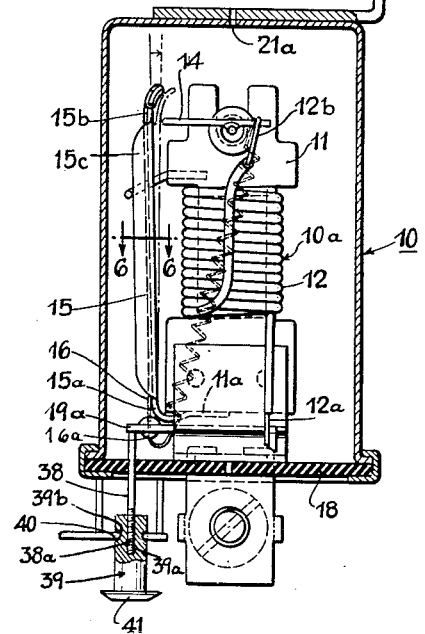
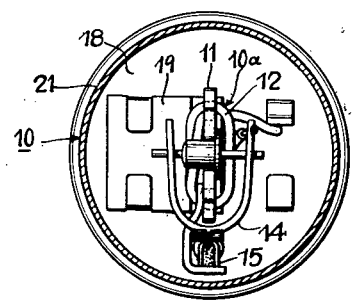
INVENTOR.
CARTER TIFFANY.
BY
ATTORNEYS INVENTOR.
CARTER TIFFANY.
BY Ward, Crosby & Neal
ATTORNEYS.

Patented Apr. 15, 1952

2,592,834

UNITED STATES PATENT OFFICE 2,592,834

HYDROCARBON GAS DETECTOR

Carter Tiffany, Englewood, N. J.

Application November 26, 1947, Serial No. 788,230

6 Claims. (Cl. 23—255)

1

This invention relates to apparatus for intermittently varying electrical currents, and more particularly to a flasher apparatus for detecting the presence of hydrocarbon vapors.

Apparatus suggested in the past for detecting the presence of hydrocarbon vapors has been expensive and inconvenient to use, and has failed to provide a detector which will indicate positively, conspicuously and conveniently the presence of hydrocarbon vapors in a satisfactory manner.

According to the present invention, apparatus is provided for overcoming the above difficulties.

Various, further and more specific objects, features and advantages of the invention will clearly appear from the detailed description given below taken in connection with the accompanying drawings which form a part of the specification and illustrate, by way of example, preferred arrangements of apparatus for carrying out the invention. The latter consists in such novel combinations of features and apparatus as may be shown and described herein. It is to be expressly understood that the invention is not limited to the embodiments shown in the drawings, reference for this purpose being had to the appended claims.

In the drawings:

Fig. 2 is a perspective view of one embodiment of the invention;

Fig. 3 is a front elevation, partly in section, of the embodiment shown in Fig. 2;

Fig. 4 is a side view, in section and with parts broken away, of the embodiment shown in Fig. 2;

Fig. 5 is a sectional view taken on line 5—5 of Fig. 3;

Fig. 6 is a sectional view of a movable armature employed in the invention, the section being taken on line 6—6 of Fig. 4;

Fig. 7 is a partly sectional view of a mounting for a thermo-responsive wire employed in the present invention;

Figure 1:
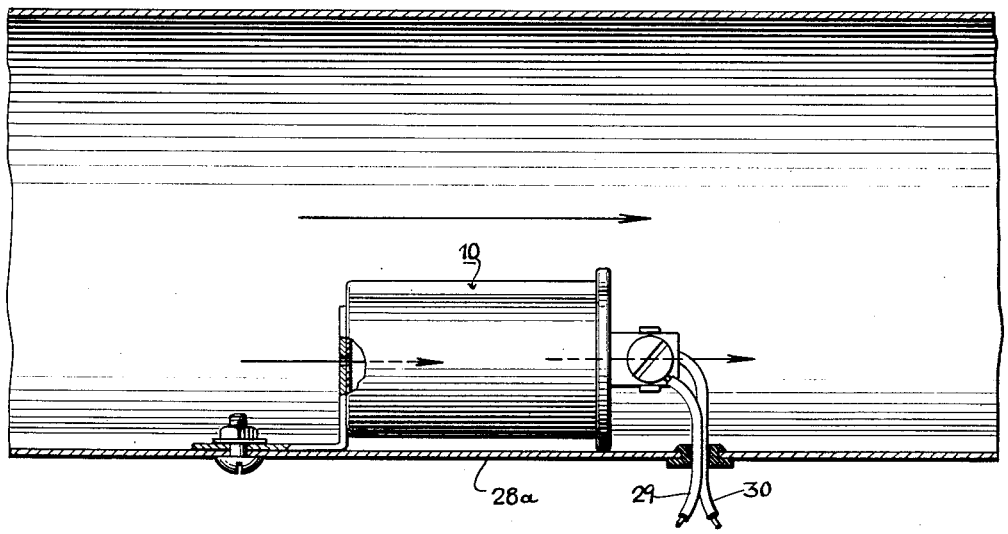
Fig. 1 is a side view, partly in section and with parts broken away, illustrating one embodiment of the invention mounted within a conduit.

The novel apparatus comprises a flasher unit, which can be of conventional or well known design, and which is employed in combination with an element for making the flasher device sensitive to the presence of hydrocarbon vapors. The flasher unit, in the form shown, comprises an electromagnet which, when energized attracts one end of an armature which is resiliently mounted at the opposite end thereof. Normally the armature is restrained from being so attracted by an expansible element such as a wire, which when cold or at ambient temperature exerts sufficient tension to prevent the movable end of the armature from moving toward the electromagnet. However, the wire is traversed by the current which traverses the electromagnet, preferably being in series therewith, which thereby heats up the wire, causing it to elongate sufficiently to permit the electromagnet to move the armature against the contact which shunts or shorts the current flow through the wire thereby eliminating such wire temporarily from the circuit. Thus the wire is permitted to cool and shrink sufficiently to retract the armature, this process continuing repeatedly through this cycle of operations so long as current is supplied.

For purposes of hydrocarbon gas detection, I propose partially or wholly to surround said element or wire with a catalyst for inducing an exothermic reaction between a hydrocarbon vapor and an oxygen containing gas such as the atmosphere. Such a catalyst, for example, comprises platinized asbestos. Thus, if the device is subjected to an atmosphere containing hydrocarbon gases, the platinized asbestos will heat up the wire through its catalytic action and thereby increase the rapidity of the flashing cycle. A conventional incandescent lamp can be connected to the above-described device whereby the change in frequency of flashes can be instantly observed.

Another embodiment of the invention comprises a flasher device, as above described having a catalyst such as platinized asbestos associated therewith, connected in a battery circuit containing in parallel a rheostat and, for example, a low voltage lamp such as a six volt automobile lamp. The rheostat is adjusted to the point where the flasher device ceases to flash in pure atmosphere, but is just on the point of flashing, so that the slightest trace of hydrocarbon gas in the atmosphere will cause said element to expand enough to cause the lamp to flash.

Referring to the drawings in further detail, the novel apparatus as shown in Figs. 2–7, inclusive, comprises a flasher unit 10 including an electromagnet 10a having a core 11 and a coil 12 wound thereabout. The coil 12 has extremities 12a and 12b (Fig. 3) which are respectively connected to a terminal 13 and a contact member 14.

Resiliently mounted upon the core 11 at 11a (Fig. 4) is an armature 15 which normally may be urged toward the core by the resilient action of a portion 15a thereof. The upper extremity 15b of the armature 15 comprises a second contact member which is adapted for engaging the first mentioned contact member 14.

Means are provided for withholding the armature 15 from movement toward the core 11, and thus for holding contact 15b away from contact 14, comprising a heat expansible resistance wire as at 16. The latter, at one extremity thereof, is secured to the movable end of the armature 15 as shown in Fig. 3, and the other extremity of said wire is rigidly secured in a mounting 16a, of suitable insulation material such as glass, as illustrated in Figs. 3, 4 and 7. The length of the wire 16 is such that at normal wire temperature it is sufficient to hold said contacts in an open position. The lower extremity, Fig. 3, of the wire 16 is connected to the coil extremity 12b by means of a suitable connection as at 17 which in the form shown includes a resistance coil.

The core 11 preferably is mounted upon a suitable insulated base 18 by means of a bracket 19 which is connected to a terminal 20. The two terminals 13 and 20 are also mounted upon the insulated base 18.

A suitable housing for the flasher device is provided comprising, for example, a cylindrical cup member 21 which is secured to the base 18. In order to permit the passage of gases through this device, suitable perforations are provided as at 18a in the base and 21a in the crown of the housing member 21.

The above-mentioned armature 15, as is well indicated in Fig. 6 is in the shape of a channel, the sides of which partially enclose the expansible wire 16. The above-mentioned catalyst is shown at 22 and conveniently can be packed within this channel shaped armature as shown particularly in Figs. 3 and 6. The catalyst in the form shown consists of platinized asbestos. However, it is possible to employ other suitable catalytic agents which are capable of inducing an exothermic reaction between a hydrocarbon vapor and oxygen containing gas such as the atmosphere.

The packing of the catalyst within the above-mentioned channel has the marked advantage of facilitating the direction of heat from the catalyst 22 upon the thermo-responsive wire 16, depending, of course, upon the heat absorptive qualities of the metal comprising the armature.

Figure 8:
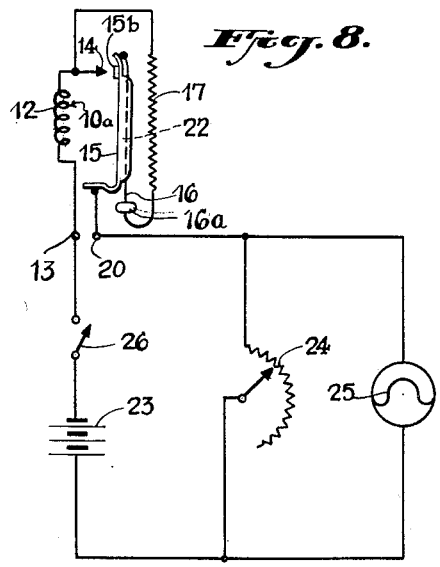
Fig. 8 is a schematic wiring diagram showing the invention connected therein.

As shown schematically in Fig. 8, the above-described flasher device is connected to a source of electric energy, for example, a battery 23 having in parallel therewith a variable resistance or rheostat 24 and an incandescent lamp, such as a low voltage automobile lamp 25. A conventional switch 26 is incorporated into the circuit.

In operation, the switch 26 is closed, thereby energizing electromagnet 10a which thus attracts the armature 15. The degree of energization of electromagnet 10a is relatively slight at this initial stage due to the resistance of wire 16 and resistance 17. However, the armature is restrained from immediately closing by virtue of the expansible wire 16 which temporarily holds the contacts 14, 15b open. The wire 16 is traversed by the same current which energizes the coil 12. Thus the restraining wire is heated and becomes temporarily elongated sufficiently to permit a closure of the contacts, thereby shunting the current flow in the wire, that is temporarily substantially eliminating wire 16 from the circuit by virtue of a short circuit. This, of course, causes the incandescent lamp 25 to flash because of the change in voltage applied thereto. During the time that the wire 16 is so shunted, it cools, shrinks and retracts the armature, thus opening said contacts. Thus the incandescent lamp 25 will flash at a predetermined frequency.

The presence of a hydrocarbon vapor will materially alter the frequency of the flashing whereby the presence of the gas can be detected. The catalyst, in the presence of a hydrocarbon vapor, and, of course, oxygen, will heat up the wire additional and thus increase the rapidity of the flashing cycle.

In the above interconnection, the rheostat 24 does not play an effective role and is not employed for affecting the other parts.

However, the rheostat 24 can be adjusted to a point where the flashing ceases when the flasher device is in pure atmosphere but is just on the point of flashing. Thus the slightest trace of hydrocarbon gas in the atmosphere can be sufficient to induce the above-mentioned exothermic heat reaction whereby the contacts are closed and the lamp is made to flash in response to hydrocarbon vapors. Of course, a ballast lamp, that is, a lamp, the resistance of which increases with voltage increase, can be substituted for the rheostat 24 to offset slight variations in the voltage source supplying the system, so that the flasher device will be subjected substantially to constant voltage in pure atmosphere.

Figure 9:
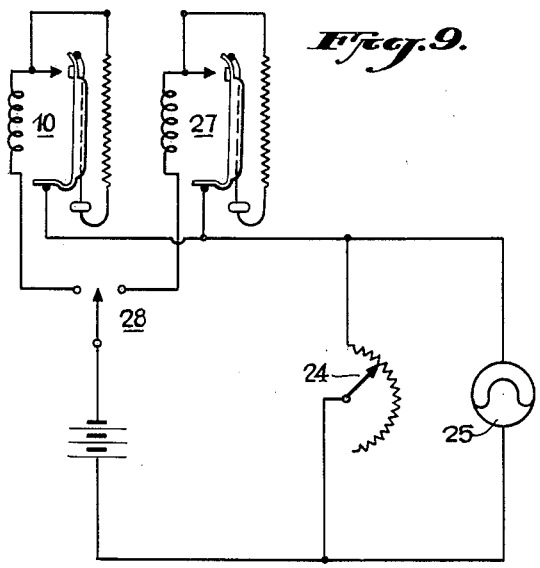
Fig. 9 is another schematic wiring diagram illustrating another embodiment of the invention.

When conditions are such that the hydrocarbon gas constantly is flowing through the detector unit, it might be impossible to adjust the unit by means of a rheostat 24 to a condition of "no gas." Under these conditions, a duplicate thermo-responsive flasher unit 27 can be connected to the circuit as shown in Fig. 9. This flasher unit 27, however, has no catalyst associated therewith. A selector switch 28 is adapted for interconnecting either the unit 27 or unit 10 into the circuit.

In operation of the combination shown in Fig. 9, the flasher unit 27 first is connected to the circuit by means of switch 28 and the rheostat 24 (Fig. 9) is adjusted to a point just short of the point of flashing after which the gas detector unit 10 is switched on in its place. Of course, if there is hydrocarbon gas present, the catalyzer will have heated the expansible wire 16 and a flashing cycle will occur.

Normally, the gas detector unit may be mounted within a duct as shown at 28a in Fig. 1, through which air suspected of carrying a hydrocarbon gas is passed. Suitable electrical leads 29 and 30 are connected to the flasher unit (Fig. 1) and, for example, to the electrical circuit as shown in Fig. 8.

Figure 10:
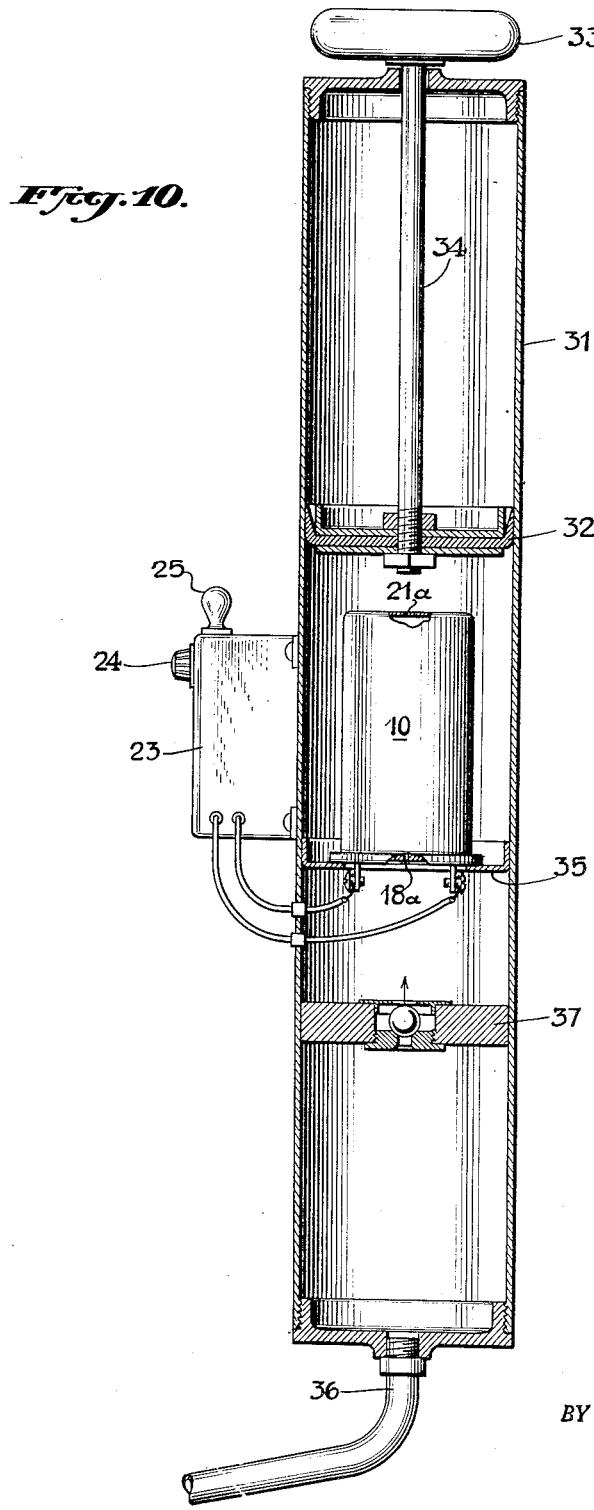
Fig. 10 is a schematic view in section of the gas detector unit employed with a hand pump.

Another form of the invention is illustrated in Fig. 10 comprising a conventional hand pump which is adapted for sucking a sample of air to be tested from a suspected region, through the gas detector unit 10. The conventional hand pump comprises in form shown a cylinder 31 having a piston 32 therein which can be reciprocated by means of a handle 33 connected in a conventional way by a shaft 34 to the piston 32. Beneath the piston 32, and out of range of its movement, the gas detector unit 10 is mounted upon a flange or partition 35 which interrupts the passage of fluid or gas within the cylinder 31 except through the above-described orifices 18a and 21a.

At the opposite extremity of the cylinder 31 a suitable conduit such as a rubber hose 36 is connected for insertion into regions, the atmosphere of which is to be tested. In order to prevent the exothermic reaction of the catalyst from starting an explosion which might spread to the region undergoing test, a ball check valve element 37 is mounted intermediate the detector unit 10 and the hose 36. The check valve permits the flow of gases only in the direction of the arrow (Fig. 10), namely, toward the gas detector unit.

The gas detector unit 10 is connected in a circuit as shown in Fig. 8, the battery 23 being indicated in Fig. 10 and the rheostat 24 and lamp 25 being mounted upon the device in any suitable manner.

The above-mentioned adjustment of tension of the element 16 can be accomplished by adjusting the position of a support 19a (Figs. 4 and 7) in which rests the insulation member 16a to which the element 16 is secured. The adjustment of the position of the support 19a by means of tools such as pliers, has been found to be tedious and time consuming. In order to overcome this, a mechanical screw adjustment device is employed as shown in Fig. 4. This device is constituted by a rod 38 which is rigidly secured at one extremity thereof to the outer extremity of the support member 19a. The rod 38 is provided with suitable threads as at 38a at the opposite extremity thereof. Mechanism is provided for axially shifting the rod 38 comprising a knob member 39 having an internally threaded bore into which the threaded extremity 38a extends. A peripheral external groove 39b is formed upon the outer surface of the knob member 39 which cooperates with a fixed ring member 40. The latter fits within said groove and holds the knob member 39 in such a manner that it can be angularly shifted but cannot be moved axially. The ring member 40 is secured by suitable supports to the base 18 of the flasher unit.

A manually shiftable pointer 41 is attached to the knob member 39. Pointer 41 can cooperate with a suitably calibrated scale for indicating the angular position thereof.

If the screw adjustment member is employed with the device illustrated in Fig. 8, the following steps can be followed: (1) Adjust the rheostat 24 to the mid-point thereof, (2) close the switch 26, (3) adjust the position of the pointer 41 to a point where flashing of the lamp 25 is just about to commence but in fact does not occur. In this condition, low current will flow between the contacts 14, 15b.

Thus a coarse mechanical adjustment is effected by means of the adjustable rod 38, and thereafter a fine adjustment can be made by means of the rheostat 24.

While the invention has been described with respect to certain preferred examples which have given satisfactory results, it will be understood by those skilled in the art after understanding the invention that various changes and modifications may be made without departing from the spirit and scope of the invention and it is intended, therefore, in the appended claims, to cover all such changes and modifications.

What is claimed as new is:

1. Apparatus for detecting the presence of hydrocarbon vapors comprising: a base member; an armature having one end resiliently mounted upon said base member the other end being movable; an expansible wire electrically in series with said armature, said wire being secured to said base member at one extremity thereof and secured to the movable end of said armature at the other extremity thereof, whereby the armature is held thereby in a preselected position; a solenoid associated with said armature and adapted for attracting same when energized, said solenoid comprising a core and a coil; means for interconnecting the extremity of said expansible wire which is secured to the base member to said solenoid; the latter and said armature being adapted for connection with a source of electric energy; and a catalyzer comprising platinized asbestos surrounding at least a portion of said wire.

2. In apparatus for the detection of hydrocarbon vapors, a pair of make-and-break contacts, one contact being fixed and the other movable relative thereto; an expansible resistance wire secured in electrical connection at one end thereof to said movable contact and secured at its other end to an insulator anchor element, an electrical connection between its other end and said fixed contact; an electro-magnet in electrical connection with said fixed contact and operative when energized for urging said movable contact toward said fixed contact; said insulated anchoring element holding said other end of said wire for maintaining the latter under tension whereby said contacts are held in spaced relation against the influence of said electromagnet while said wire is below a preselected temperature; said electromagnet being adapted to be connected to said movable contact in a circuit in which, in response to a flow of electrical energy, said expansible resistance wire is heatable, said wire being expansible when so heated above said preselected temperature by current flowing therein to permit said contacts to close under the influence of said electromagnet thereby short circuiting said wire by means of a path of relatively low resistance whereby said wire can cool and shrink during such short circuiting and pull open said contacts; and a catalyst mounted in contact with said wire for heating same in response to the occurrence of a hydrocarbon vapor in the presence of an oxygen containing gas.

3. In a device for the detection of hydrocarbon vapors, a fixed electrical contact; a movable member; an electrical contact mounted upon said member and positioned thereon to engage said fixed contact in response to movement of said member; an expansible resistance wire having one extremity thereof secured to said member and in electrical connection with the contact mounted thereon, the other extremity of said wire being secured to an insulator anchor element, an electrical connection between such other extremity and said fixed contact, said insulated anchoring device holding said resistance wire under tension and biasing said member toward an open contact position responsive to a preselected contracted condition of said wire, the latter being expansible under the influence of heat for reducing said tension to allow said member to move to a contact closed position; an electromagnet having a coil, one portion of which is electrically connected to said fixed contact, said electromagnet being positioned for urging, when energized, said movable member towards a closed contact position; biasing means associated with said movable member for yieldingly urging same toward a contact closing position; said coil at another portion thereof being adapted to be connected to said movable contact in a circuit in which, in response to a flow of electrical energy, said expansible resistance wire is heatable and can expand to allow said contacts to close, such wire being temporarily short circuited until such wire cools, shrinks, and pulls open said contacts; and a catalytic substance surrounding at least a portion of said wire for heating same in response to the occurrence of a hydrocarbon vapor in the presence of oxygen for influencing the rate of expansion and contraction of said wire.

4. In apparatus for detecting hydrocarbon vapors, a first flasher unit including: a pair of make-and-break contacts, one of said contacts being mounted for movement relative to the other, a support member for said movable contact for resiliently holding same in a preselected position relative to said other contact, a heat expansible resistance wire secured at one end to and in electrical connection with the movable contact, the other end of said wire being electrically connected to the other contact, an insulator anchor member, said wire being held under tension by said support member and said insulator anchor member, said contacts being movable to an open position in response to a contraction of said wire, an electromagnet including a coil positioned for urging said movable contact toward the other contact, means for electrically connecting the coil at one extremity thereof to said movable contact and at its other extremity to said other contact whereby an electric circuit is formed including said wire and said coil in series when said contacts are open, said wire being short circuited when said contacts are closed whereby such wire can cool and shrink during such closure to pull open said contacts; a second flasher unit as above specified, a catalytic substance, including finely divided platinum, mounted in contact with the resistance wire of the second flasher for heating said wire responsive to the occurrence of hydrocarbon vapor and oxygen; and means including a switch for connecting in one position thereof a source of electromotive force in circuit with said first flasher unit and in another position with said second flasher unit.

5. In a gas detector apparatus, an electromagnet including a core and a coil; a movable armature cooperating therewith, said armature being formed with a channel therein; a contact carried by said armature and movable therewith; a fixed contact positioned for engagement with said armature carried contact in response to armature movement; an insulator anchor element; a heat expansible resistance wire secured in electrical connection at one end thereof to said armature carried contact and secured at its other extremity to said insulator anchor element, such other extremity being electrically connected to said fixed contact, said wire being positioned throughout a substantial portion of the length thereof in the channel of the armature and also being held under tension, whereby said contacts are normally held in an open position when said wire is at normal temperature and said armature is biased in a retracted position relative to said electromagnet, the coil of said magnet being electrically connected at one portion thereof to said fixed contact and at another portion thereof to said movable contact; and a catalyst element comprising platinized asbestos mounted in contact with said wire in the channel of said armature for producing heat in response to the occurrence of a hydrocarbon vapor in the presence of oxygen whereby the force exerted by said wire in biasing said armature toward the retracted position is responsive to the quantity of hydrocarbon vapor and oxygen.

6. Apparatus for detecting hydrocarbon gases comprising: a solenoid including a coil and a core; an armature mounted adjacent said coil and attractable thereto in response to a flow of electric current through the solenoid; an expansible wire attached at one extremity thereof to said armature, the opposite extremity of such wire being secured to a fixed insulated mounting whereby said armature is biased toward a retracted position relative to said core when such wire is at a normal temperature; a catalyzer surrounding at least a portion of said wire for heating same in response to the occurrence of a hydrocarbon vapor with oxygen; means for electrically interconnecting the fixedly secured extremity of said wire to one extremity of said coil; said coil at another portion thereof being adapted to be connected to said armature in a circuit in which, in response to a flow of electrical energy, said expansible wire is heatable and can expand; and a contact connected to said coil and positioned for engagement with said armature in response to expansion of said wire and energization of said coil, said wire being temporarily short circuitable in response to said armature engaging said contact until such wire cools, shrinks and separates said armature and contact.

CARTER TIFFANY.

REFERENCES CITED

The following references are of record in the file of this patent:

UNITED STATES PATENTS

| Number | Name | Date |
|---|---|---|
| 970,923 | Hinman | Sept. 20, 1910 |
| 996,498 | Mann | June 27, 1911 |
| 1,185,211 | DiLegge | May 30, 1916 |
| 1,242,575 | Milano | Oct. 9, 1917 |
| 1,313,323 | Nobles | Aug. 19, 1919 |
| 1,467,911 | Arendt et al. | Sept. 11, 1923 |
| 1,653,685 | Whittington | Dec. 27, 1927 |
| 2,299,815 | Gent | Oct. 27, 1942 |
| 2,345,772 | Robertson et al. | Apr. 4, 1944 |

FOREIGN PATENTS

| Number | Country | Date |
|---|---|---|
| 11,101 of 1890 | Great Britain | May 30, 1891 |
| 521,098 | Great Britain | May 13, 1940 |